United States Patent
Fukushi et al.

(10) Patent No.: US 12,509,358 B2
(45) Date of Patent: Dec. 30, 2025

(54) TUNGSTEN OXIDE POWDER AND METHOD FOR PRODUCING TUNGSTEN OXIDE POWDER

(71) Applicants: KABUSHIKI KAISHA TOSHIBA, Tokyo (JP); TOSHIBA MATERIALS CO., LTD., Yokohama (JP)

(72) Inventors: Daisuke Fukushi, Yokohama (JP); Hideaki Hirabayashi, Yokohama (JP); Akito Sasaki, Yokohama (JP); Ryosuke Hiramatsu, Yokohama (JP); Atsuya Sasaki, Yokohama (JP); Takaki Morooka, Narita (JP); Yoichiro Mori, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 958 days.

(21) Appl. No.: 17/448,241

(22) Filed: Sep. 21, 2021

(65) Prior Publication Data
US 2022/0002166 A1   Jan. 6, 2022

Related U.S. Application Data

(63) Continuation of application No. PCT/JP2020/013581, filed on Mar. 26, 2020.

(30) Foreign Application Priority Data

Mar. 28, 2019   (JP) .................................. 2019-063830

(51) Int. Cl.
*C01G 41/02*   (2006.01)

(52) U.S. Cl.
CPC .......... *C01G 41/02* (2013.01); *C01P 2004/04* (2013.01); *C01P 2004/61* (2013.01)

(58) Field of Classification Search
None
See application file for complete search history.

(56) References Cited

U.S. PATENT DOCUMENTS

| 10,283,776 | B2 | 5/2019 | Sasaki et al. |
| 2015/0034149 | A1 | 2/2015 | Sasaki et al. |
| 2017/0256797 | A1 | 9/2017 | Sasaki et al. |

(Continued)

FOREIGN PATENT DOCUMENTS

| CN | 1613777 A | 5/2005 |
| CN | 101381106 A | 3/2009 |
| CN | 105051950 A | 11/2015 |

(Continued)

OTHER PUBLICATIONS

Wonchull Han, et al., "Electrochemical Intercalation of Lithium into Hexagonal $WO_3$, Framework Obtained from Ammonium Paratungstate," *Electrochemistry and Industry Physical Chemistry*, vol. 66, No. 12, Dec. 1998, pp. 1230-1233.

(Continued)

*Primary Examiner* — Yun Qian
(74) *Attorney, Agent, or Firm* — BURR PATENT LAW, PLLC (57) ABSTRACT

According to one embodiment, a tungsten oxide powder is provided. The tungsten oxide has an average particle size along a major axis of 10 μm or less, an average aspect ratio of 10 or less, and 0 to 4 crystal defects per unit area of 9 $nm^2$ on a surface or sectional surface in a direction of a minor axis of a primary particle.

3 Claims, 4 Drawing Sheets

(56) References Cited

U.S. PATENT DOCUMENTS

2020/0048107 A1   2/2020   Shigesato et al.

FOREIGN PATENT DOCUMENTS

| | | |
|---|---|---|
| CN | 108439473 A | 8/2018 |
| CN | 108862389 A | 11/2018 |
| EP | 3 633 784 A1 | 4/2020 |
| WO | 2014/142066 A1 | 9/2014 |
| WO | 2016/039157 A1 | 3/2016 |
| WO | 2018/199020 A1 | 11/2018 |
| WO | 2018/216692 A1 | 11/2018 |

OTHER PUBLICATIONS

International Search Report and Written Opinion (Application No. PCT/JP2020/013581) dated Jun. 9, 2020 (with English translation).
Weiwei Yu et al. "*Improving Gas Sensing Performance by Oxygen Vacancies in Sub-Stoichiometric $WO_{3-x}$,*", RSC Advances, vol. 9, pp. 7723-7728.
Han W et al. "Synthesis of the Hexagonal Form of Tungsten Trioxide from Peroxopolytungstate via Ammonium Paratungstate Decahydrate", Bulletin of the Chemical Society of Japan, vol. 71, 1998, pp. 933-937.
Weiwei Yu et al. "Improving Gas Sensing Performance by Oxygen Vacancies in Sub-Stoichiometric $WO_{3-x}$,", RSC Advances, vol. 9, 2019, pp. 7723-7728.
Extended European Search Report dated Dec. 1, 2022.

TUNGSTEN OXIDE POWDER AND METHOD FOR PRODUCING TUNGSTEN OXIDE POWDER

CROSS-REFERENCE TO RELATED APPLICATIONS

This application is a Continuation Application of PCT Application No. PCT/JP2020/013581, filed Mar. 26, 2020 and based upon and claiming the benefit of priority from prior Japanese Patent Application No. 2019-063830, filed Mar. 28, 2019, the entire contents of all of which are incorporated herein by reference.

FIELD

Embodiments described herein relate generally to a tungsten oxide powder and a method for producing the tungsten oxide powder.

BACKGROUND

Tungsten oxide powders are used for various materials or devices, such as an electrode material for batteries, photocatalyst, sensors, electrochromic device, or the like. For example, in International Publication No. 2016/039157 (hereinafter, Patent Literature 1), hopping conduction characteristics are imparted to improve performances. In International Publication No. 2018/199020 (hereinafter, Patent Literature 2), spectroscopic ellipsometry is used to improve performances.

For the tungsten oxide powders in Patent Literature 1 and Patent Literature 2, fine powders having an average particle size of 50 nm or less are used. As a method of producing fine powders, a sublimation process using plasma flame is adopted. Plasma flame has a high temperature of several thousands of degrees C. (° C.). Also in Patent Literature 1, to manufacture a tungsten oxide powder free of defects, the tungsten oxide powder after the sublimation process is subjected to a heat treatment in an oxygen-including atmosphere.

Producing tungsten oxide powders through the sublimation process is suitable for producing small particle size powders. On the other hand, since heat treatments were repeated, grain growth was liable to occur. When grain growth occurred, the powder had a large aspect ratio of 10 or more. When the aspect ratio was 10 or more, the power had easily fractured. Crystal defects had formed on a fractured cross-sectional surface. When crystal defects had formed, intercalation property was adversely affected.

Intercalation indicates insertion of another substance into spaces within substances of a layered structure. Intercalation involves a reversible reaction. By imparting the intercalation property to a tungsten oxide powder, Li ions can be reversibly taken in and out of the powder. Utilizing the property, the tungsten oxide powder has been applied to various fields, such as electrode materials.

Patent Literature 2 discloses a liquid phase synthesis method. The liquid phase synthesis method is a wet synthesis method using a pH-adjusted aqueous solution. By virtue of being a wet method, the powder is not exposed to a high temperature like that of plasma flame. Therefore, the powder having an aspect ratio of 5 or less had been obtained. However, the tungsten oxide powder obtained by the liquid phase synthesis disclosed in Patent Literature 2 had many crystal defects formed.

DETAILED DESCRIPTION

The tungsten oxide powder according to an embodiment is characterized in that an average particle size along a major axis is 10 μm or less, an average aspect ratio is 10 or less, and there are 0 to 4 crystal defects per unit area of 9 $nm^2$ on a surface or sectional surface in a direction of a minor axis of a primary particle.

Figure 1:
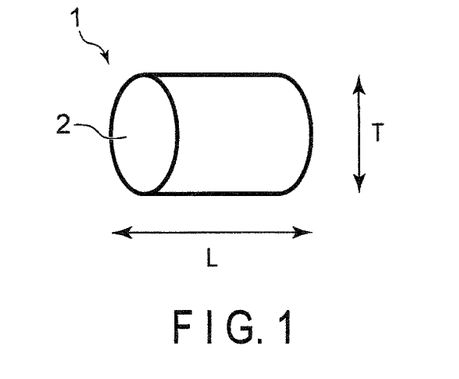
FIG. 1 is a diagram showing an example of a tungsten oxide powder according to an embodiment.
Figure 2:
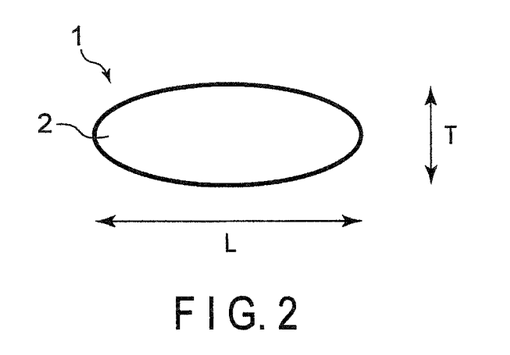
FIG. 2 is a diagram showing another example of a tungsten oxide powder according to the embodiment.

FIG. 1 and FIG. 2 show examples of a tungsten oxide powder according to an embodiment. In the figures, reference numeral 1 denotes a tungsten oxide powder, reference numeral 2 denotes a surface in a minor axis direction, symbol L denotes a major axis, and symbol T denotes a minor axis. As examples, FIG. 1 shows a cylindrical shape, and FIG. 2 shows an elliptical shape. The tungsten oxide powder according to the embodiment is not limited to a cylindrical or elliptical shape. For example, other shapes include that of a flaky flat plate, or a pebble-shape (an ellipse having a distorted contour).

The tungsten oxide powder has an average particle size along the major axis of 10 μm or less and an average aspect ratio of 10 or less. The major axis and the minor axis of the tungsten oxide powder are measured using a scanning electron microscope (SEM) photograph, which is scaled up 3000 times or more. The major axis is the longest diagonal line of the tungsten oxide powder seen in the SEM photograph. The minor axis indicates the width along a line drawn perpendicularly from the center of the major axis. The major axis and the minor axis of the tungsten oxide powder as a primary particle is obtained. These measurements are performed on 100 particles, and the average value for the major axis is taken as the average particle size along the major axis. Calculations of major axis/minor axis are performed on 100 particles, and the average value thereof is defined as an average aspect ratio.

The tungsten oxide powder of the embodiment has an average particle size along the major axis of 10 μm or less. When the average particle size along the major axis is greater than 10 μm, the particle size may have variance. When the particle size has variance, the load density may be difficult to control when forming an electrode layer or the like. Therefore, the average particle size along the major axis is 10 μm or less, preferably 5 μm or less, and more preferably 3 μm or less. The lower limit of the average particle size along the major axis is not particularly restricted, but is preferably 0.01 μm or more. When the average particle size is less than 0.01 μm, production by the later-described liquid phase synthesis method is difficult.

The average aspect ratio is 10 or less. When the aspect ratio is greater than 10, the tungsten oxide powder easily fractures. When the tungsten oxide powder fractures, a crystal defect is easily formed on the fractured cross-sectional surface. Therefore, the average aspect ratio is preferably 7 or less, and more preferably, 5 or less. It is preferable that all the tungsten oxide powders have an aspect ratio of 10 or less. The lower limit of the aspect ratio is 1. The aspect ratio is preferably 1.5 or more. When the aspect ratio is 1.5 or more, a later-described hexagonal tunnel structure along the major axis is easily imparted.

In the tungsten oxide powder, 0 to 4 crystal defects per unit area of 9 $nm^2$ are present on a surface or sectional surface in the minor axis direction of a primary particle. A primary particle refers to one grain of powder. A secondary particle refers to a state in which primary particles are agglomerated.

A surface in the minor axis direction of a primary particle refers to a surface directed toward the direction of the minor axis. When the particle has a cylindrical shape as shown in FIG. 1, the bottom of the cylinder is the surface in the minor axis direction. When the particle has an elliptical shape as shown in FIG. 2, the curved surface viewed in the minor axis direction is the surface in the minor axis direction.

In the tungsten oxide powder according to the embodiment, the number of crystal defects is 0 to 4 per unit area of 9 $nm^2$ on a surface or sectional surface in the minor axis direction of a primary particle. The crystal defect is a lattice defect, and indicates an irregular disorder of atoms. The crystal defect can be observed through a scanning transmission electron microscope (STEM). When the surface in the minor axis direction is observed through a STEM, an ordered crystal lattice is observed. When a crystal defect is present, a disordered crystal lattice is observed. The observation through the STEM is performed in a measurement field of view of 3 nm×3 nm. In the tungsten oxide powder of the embodiment, regardless of whatever part of the surface or sectional surface in the minor axis direction is measured, the number of crystal defects formed per unit area of 9 $nm^2$ is 0 to 4. As a simplified method, it suffices to select and measure three sections with unit areas of 9 $nm^2$ on the surface in the minor axis direction of the tungsten powder, for example, any three grains of powder. In the case of an ordered crystal lattice, holes are observed arranged in an ordered manner (at regular intervals) in the STEM observation image. If the presence of crystal defect(s), place(s) including no hole is present, whereby place(s) where holes are not arranged in order is present.

The hole observed in the STEM observation image may be, for example, a hexagonal tunnel described later.

Even when no holes are observed in the STEM observation image, the presence or absence of crystal defects can be determined based on the regularity of the image contrast. It is determined that there is a crystal defect in a place where the black and white contrast is irregular.

A row of crystal defects connected in a line in a certain direction may be observed. Defects connected in the same direction as such are counted as one crystal defect.

When the surface in the minor axis direction is not flat, the cross section in the minor axis direction of tungsten oxide powder may be measured. In addition, it suffices to observe crystal defects on either one of the surface or the cross section of the primary particle in the minor axis direction.

In the measurement by the STEM, a sample obtained by obtaining a thin film of the powder by a dispersion method is observed with a scanning transmission electron microscope having an aberration correction function (Cs-corrected STEM) at an acceleration voltage of 200 V.

A crystal defect is an irregular disorder of atoms. A tungsten oxide powder undergoes intercalation of metal ions from the surface. If there is a crystal defect on the surface, the intercalation property is degraded. Therefore, on the surface in the minor axis direction, the crystal defects per unit area of 9 $nm^2$ is preferably 4 or less, and more preferably 2 or less. Most preferable is a state with no crystal defects (0). Further, the surface in the major axis direction preferably has 1 or less crystal defects (including 0) per unit area of 9 $nm^2$. More preferably, there are no crystal defects on the surface in the major axis direction. Further, the presence or absence of defects in the major axis direction may be determined by examining the unit area of 9 $nm^2$ at any one place.

Further, the tungsten oxide powder preferably has a hexagonal tunnel structure along the major axis. Having a hexagonal tunnel structure in the major axis direction means a state in which the hexagonal tunnel structure continues from one end to the other end in the major axis direction. Having the hexagonal tunnel structure facilitates observation of the presence or absence of crystal defects. When the powder has a hexagonal tunnel structure, a hole is observed. The hole is a hexagonal tunnel structure. By having the hexagonal tunnel structure, the path of metal ions can be made straight. As a result, the intercalation property can be improved. Further, a tunnel structure along the major axis can be formed by reducing the crystal defects.

In addition, the hexagonal tunnel structure can be measured by the STEM. By observing the sample, obtained by making a thin film of the powder by the dispersion method, with a scanning transmission electron microscope with an aberration correction function (Cs-corrected STEM) at an acceleration voltage of 200 V, it is possible to see that the hexagonal tunnel is linearly present along the major axis. As a simplified method, the observation may be performed at both ends and the center of the tungsten oxide powder.

Figure 4:
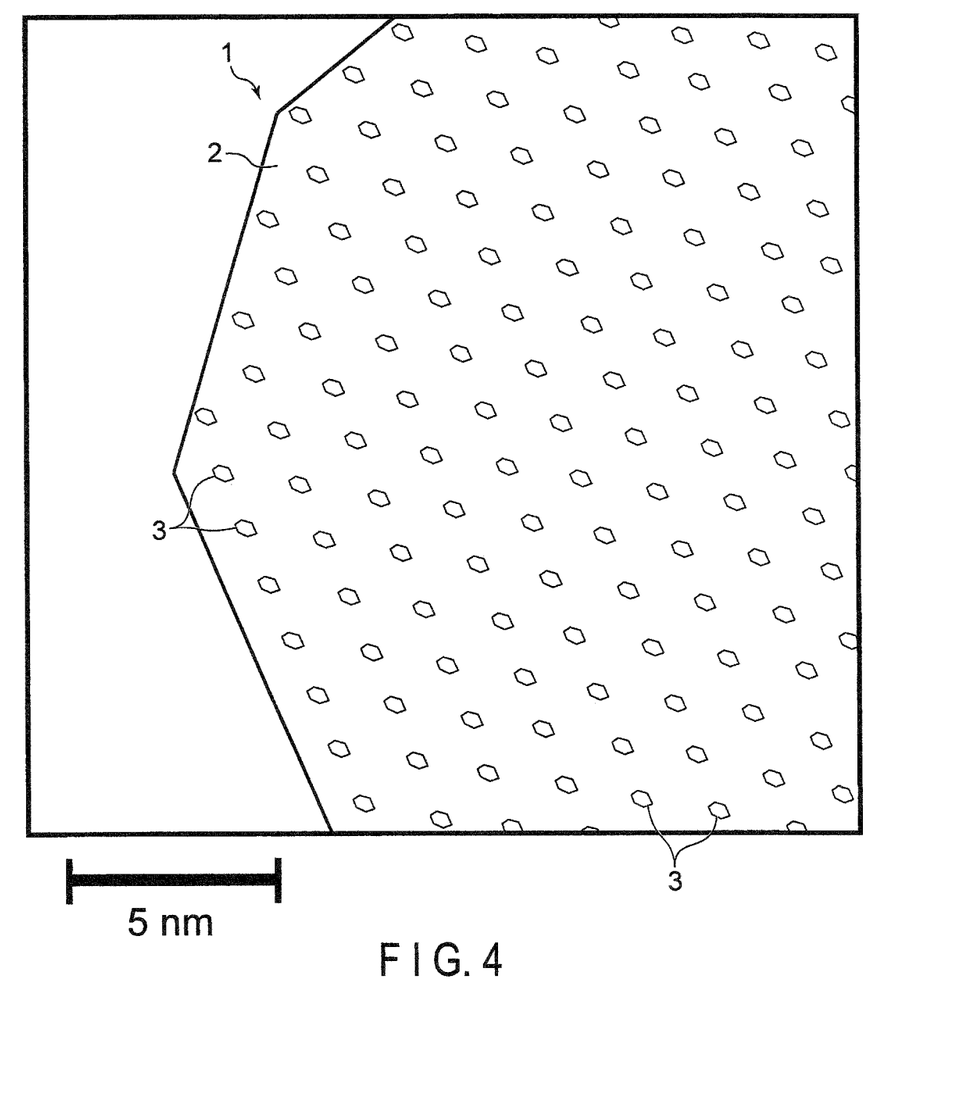
FIG. 4 is a schematic diagram showing an example of a scanning transmission electron microscope (STEM) observation image of a surface in a minor axis direction of a tungsten oxide powder.
Figure 5:
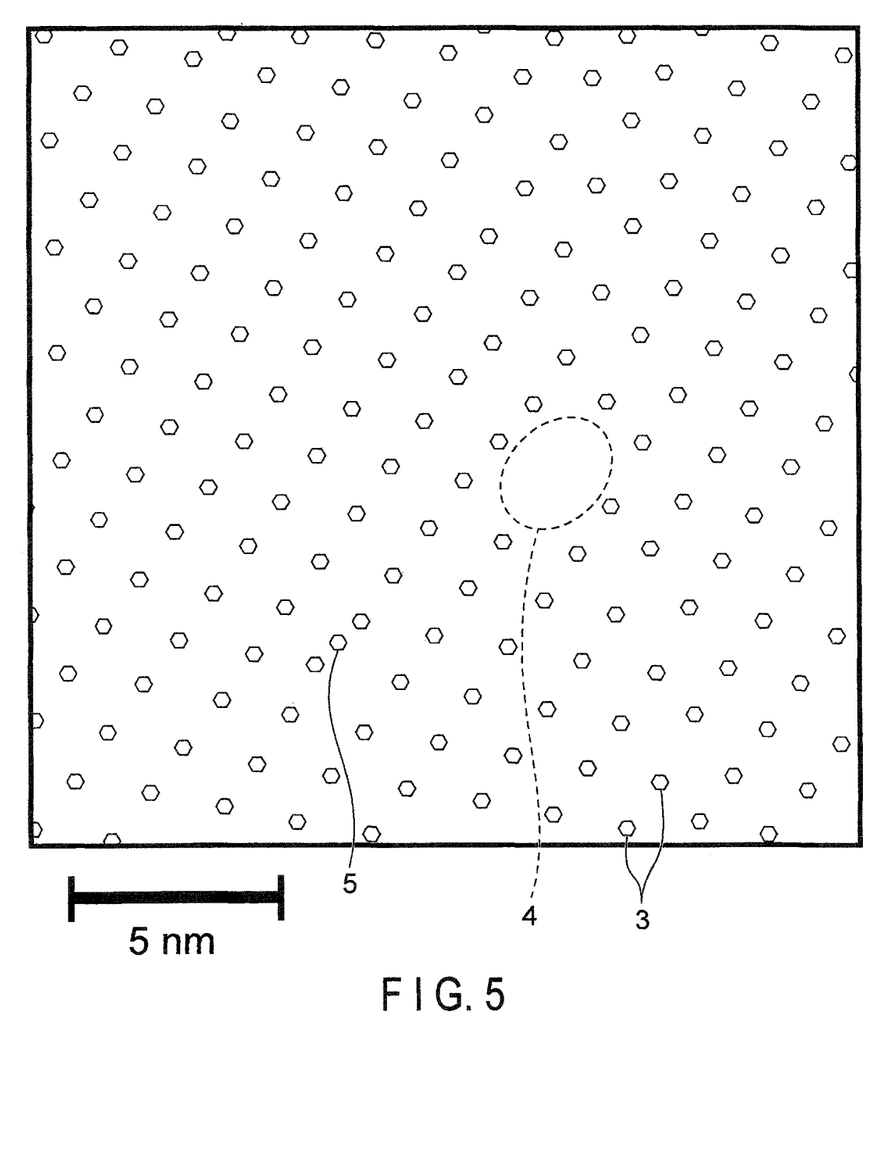
FIG. 5 is a schematic diagram showing another example of a STEM observation image of a surface in a minor axis direction of a tungsten oxide powder.
Figure 6:
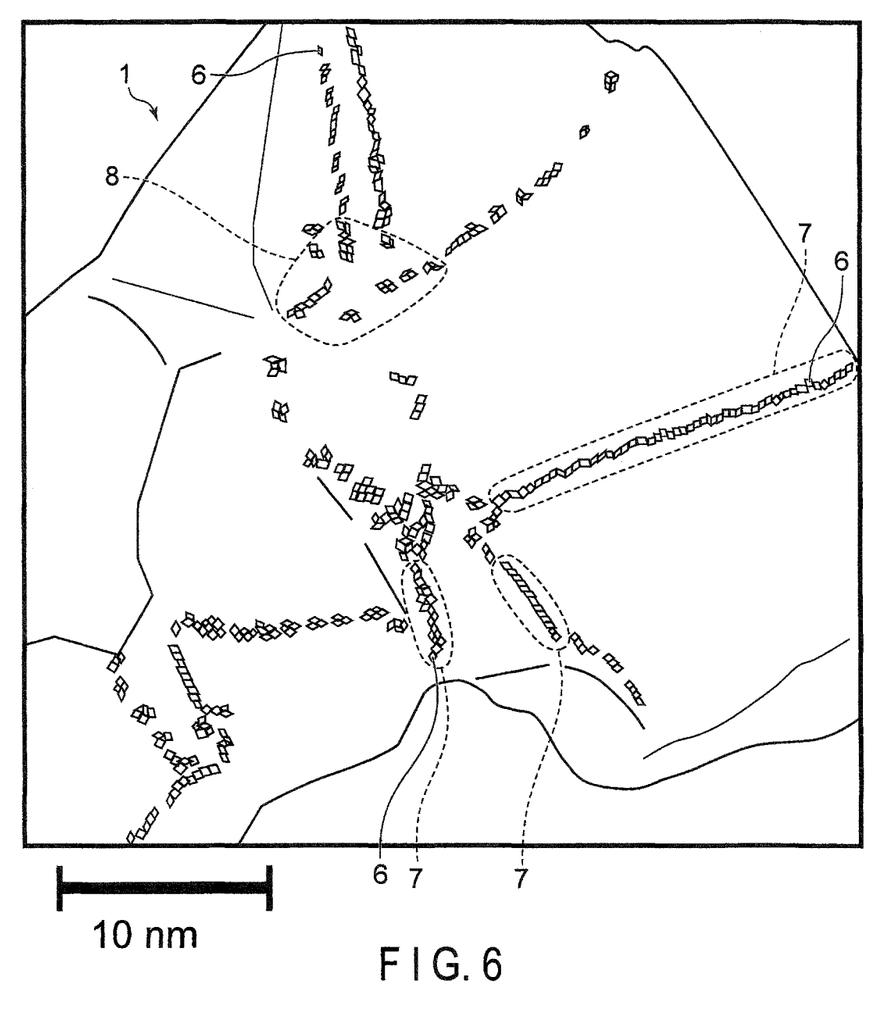
FIG. 6 is a schematic diagram showing a STEM observation image of a surface including a major axis direction of a tungsten oxide powder.

An example of the STEM measurement of a tungsten oxide powder according to the embodiment is shown in FIGS. 4 to 6. In the figures, reference numeral 1 denotes a tungsten oxide powder, reference numeral 2 denotes a surface in the minor axis direction, reference numeral 3 denotes hexagonal tunnels, reference numeral 4 denotes a region in which hexagonal tunnels are blocked by crystal defects or a region in which hexagonal tunnels are not formed as a consequence of crystal defects, reference numeral 5 denotes a crystal defect caused by a misalignment of the hexagonal tunnel, reference numeral 6 denotes crystal defects, reference numeral 7 denotes groups of crystal defects connected in a line in the same direction, and reference numeral 8 denotes a region including a plurality of crystal defects. FIG. 4 schematically shows an observation image on the surface in the minor axis direction including no crystal defects (the number thereof is zero). FIG. 5 schematically shows an observation image of the surface in the minor axis direction including crystal defects. FIG. 6 schematically shows an observation image on the surface in the major axis direction including a plurality of crystal defects.

In FIG. 4, the hexagonal tunnels 3 are arranged in an ordered manner on the surface 2 in the minor axis direction of the tungsten oxide powder 1, and no crystal defect is seen.

In FIG. 5, a portion where the arrangement of hexagonal tunnels 3 is out of order can be seen, and a crystal defect is present there. Specifically, on one hand, since there are no hexagonal tunnels in the region 4, the distance between the hexagonal tunnels 3 arranged across the region 4 is far. In other words, in the region 4, at two positions where hexagonal tunnels are expected to be present from the arrangement pattern of the other hexagonal tunnels 3, the hexagonal tunnels are filled due to the crystal defects. On the other hand, a hexagonal tunnel (crystal defect 5) that does not follow the arrangement pattern of the other hexagonal tunnels 3 is formed. Due to the crystal defect 5, a hexagonal tunnel is provided at a position close to other hexagonal tunnels 3. The observation image shown in FIG. 5 includes a total of three crystal defects.

FIG. 6 shows a plurality of crystal defects 6, a part of which are adjacent to one other. A group of crystal defects 7 connected in a line in one direction is counted as one crystal defect in STEM observation. A region 8 contains eight crystal defects.

Further, the tungsten oxide powder preferably includes an oxygen deficiency. The resistance value can be lowered by providing an oxygen deficiency. The tungsten oxide powder according to the embodiment can be used in various fields, such as photocatalytic material, electrochromic material, and electrode material for batteries.

The resistance value of the electrode material for batteries can be lowered by providing oxygen deficiency. When oxygen deficiency is provided, the deficiency is preferably within the range of $WO_{3-x}$ $0.1 \leq x \leq 0.3$. When the x value is smaller than 0.1, the effect of providing oxygen deficiency is small. If the x value is larger than 0.3, the oxygen deficiency becomes too much and the performance deteriorates. By lowering the resistance value of the tungsten oxide powder, the internal resistance can be lowered when making an electrode layer.

The amount of oxygen deficiency is measured by chemical analysis to quantify the amount of $KMnO_4$ required to oxidize all W ions having a low charge ($W^{4+}$, $W^{5+}$) into $W^{6+}$ using a $KMnO_4$ solution. By this analysis, the x value can be obtained by replacement into $WO_{3-x}$. When the x value exceeds 0, the powder is determined to have oxygen deficiency. In other words, when the x value is 0, the powder is to have no oxygen deficiency.

Note, that as described above, if the crystal defect(s) is present, the arrangement of holes will be disordered. A crystal defect and an oxygen defect can be distinguished.

It is also possible to distinguish between a crystal defect and an oxygen defect (oxygen deficiency) by an analysis by the X-ray diffraction (XRD) method. An XRD peak obtained by measuring the sample may be compared with an XRD peak of $WO_3$. A powder diffraction file (PDF) card may be used instead of the measured value of the XRD peak of $WO_3$. With a crystal defect, the peak becomes broad. With an oxygen defect, the peak is shifted.

The XRD measurement is performed under the conditions of a Cu target, a tube voltage of 40 kV, a tube current of 40 mA, an operation axis of $2\theta/\theta$, a scanning range ($2\theta$) of $10°$ to $50°$, a scanning speed of $0.1°/sec$, and a step width of $0.01°$. The amount of the measurement sample is 0.1 g or more.

Further, with a photocatalyst, when the tungsten oxide powder is irradiated with light, light is absorbed to form electrons and holes. The electrons and holes can react with moisture in the air and change into active oxygen and hydroxide radical to exhibit photocatalytic performance. When the photocatalytic performance is exhibited, odorous components and the like can be decomposed. Since the photocatalyst absorbs light to generate electrons and holes, oxygen deficiency need not be provided.

Further, an electrochromic device is a device in which reversible change in optical properties occur by electric charge. Electrochromic devices are used in display devices such as for electronic books and displays. By virtue of having excellent reversible reactivity of optical properties, black-and-white inversion (switching of display) is possible at high speed. Further, by providing oxygen deficiency, black and white can be inverted with low resistance.

In addition, a proton intercalation device is known as a kind of electrochromic device. The proton intercalation device has a function of reacting tungsten oxide powder with cations or anions to perform charging or coloring. The intercalation property contributes to the reaction with ions. Taking advantage of this property, application to window glass has been attempted. When a thin film is provided on the window glass and a voltage is applied thereto, the thin film absorbs visible light or infrared rays and becomes colored. Accordingly, visible light or infrared rays can be blocked. Window glass is used in various places such as vehicles, aircrafts, and buildings. For example, if an automobile is left unattended during the day, the car interior becomes hot. The same is true inside buildings, and heat stroke has become a social problem in recent years. Tungsten oxide powder has the ability to absorb both visible light and infrared rays. When a thin film containing tungsten oxide powder is used for a proton intercalation device, the film can absorb visible light and infrared rays. Further, by providing oxygen deficiency, a reversible reaction of optical properties can be caused with low resistance. Thereby, a thin film capable of blocking light with low resistance can be provided.

The tungsten oxide powder is also effective as an electrode material for batteries. Examples of the battery include a Li-ion secondary battery, a capacitor, a condenser, and a power storage device. Batteries can be charged and discharged by taking in and releasing ions (or electrons). By improving the intercalation property, it is possible to smoothly take in and release ions during charging and discharging. Accordingly, the performance of the battery can be improved.

The powder can also be used as a sensor by utilizing the intercalation property.

Further, the tungsten oxide powder preferably contains a monoclinic crystal as a main component. Tungsten oxide ($WO_3$) has any crystal structure among a monoclinic crystal, an orthorhombic crystal, a tetragonal crystal, a trigonal crystal, and a hexagonal crystal. $WO_3$ is stable as a monoclinic crystal in the range of $17°$ C. to $330°$ C. The aforementioned electrode materials for batteries, photocatalytic materials, and electrochromic materials are generally used at room temperature. By using a monoclinic crystal as the main component, stable performance can be maintained.

In tungsten oxide powder containing the monoclinic crystal as the main component, 50% by mass or more of the crystal structure belongs to the monoclinic crystal.

Whether or not the monoclinic crystal is the main component can be measured by XRD analysis. If the monoclinic crystal is the main component, a peak is detected around $24.4°$. The XRD measurement is performed under the conditions of a Cu target, a tube voltage of 40 kV, a tube current of 40 mA, an operation axis of $2\theta/\theta$, a scanning range ($2\theta$) of $10°$ to $50°$, a scanning speed of $0.1°/sec$, and a step width of $0.01°$. The amount of the measurement sample is 0.1 g or more.

The peak of $24.4°$ is a representative peak of the monoclinic crystal noted on the PDF card. That is, the containing of the monoclinic crystal as the main component indicates that 50% by mass to 100% by mass in an assembly of tungsten oxide powder (tungsten oxide powder group) includes a monoclinic crystal.

Therefore, the powder can be used as any one of photocatalytic material, electrochromic material, and electrode material for batteries.

For example, when used for photocatalytic material, decomposition performance can be improved. In addition, when used in electrochromic material, the black-and-white inversion speed and durability can be improved. Furthermore, when used as an electrode material for batteries, power density, energy density, and capacity retention rate are improved.

Among these, use in a power storage device is favorable. The power storage device refers to a device in which a negative electrode and a positive electrode are opposed to each other with an electrically non-conductive layer interposed therebetween, uses an electrolytic solution, for example, and is capable of repeating a reaction of accumulating electric charges (charging) and a reaction of releasing electric charges (discharging) by oxidation-reduction reactions or by adsorption/desorption of ions.

By improving the intercalation property, the reaction of accumulating and discharging the electric charges can be smoothly performed. Thereby, the power density and the energy density of the battery can be improved. In addition, the durability is improved because crystal defects are suppressed. Therefore, the capacity retention ratio can also be improved.

Figure 3:
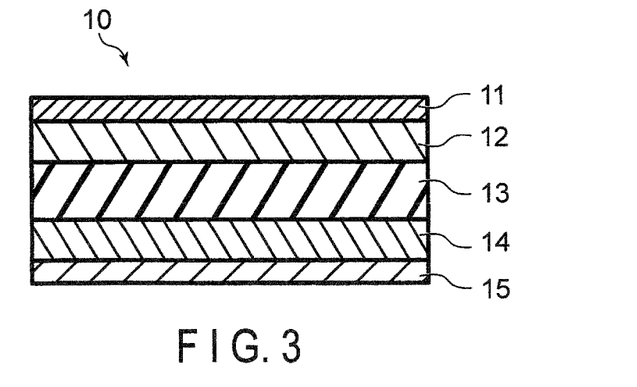
FIG. 3 is a conceptual diagram showing a power storage device.

FIG. 3 is a conceptual diagram showing the configuration of a power storage device. In the drawing, reference numeral 10 denotes a power storage device; reference numeral 11 denotes a negative-electrode-side electrode layer; reference numeral 12 denotes a negative electrode layer; reference numeral 13 denotes a separator layer; reference numeral 14 denotes a positive electrode layer; and reference numeral 15 denotes a positive-electrode-side electrode layer. FIG. 3 shows a structure of a cell portion.

The negative-electrode-side electrode layer 11 and the positive-electrode-side electrode layer 15 are formed of a material having electrical conductivity. Examples of the material having electrical conductivity include aluminum, copper, stainless steel, platinum, ITO, IZO, FTO, $SnO_2$, and $InO_3$. A thickness within a range of from 5 µm to 50 µm is preferable.

The tungsten oxide powder according to the embodiment is preferably used for either one of the negative electrode layer 12 or the positive electrode layer 14. The tungsten oxide powder according to the embodiment is preferably used for the negative electrode layer 12. Further, the negative electrode layer 12 preferably contains 50% by mass to 100% by mass of the tungsten oxide powder according to the embodiment. Furthermore, in the negative electrode layer 12, the void fraction is preferably 10% by volume to 60% by volume.

For the positive electrode layer 14, a Li composite oxide, such as $LiCoO_2$, $LiMnO_2$, or $LiNiO_2$, is preferably used. In terms of a Li counter electrode, a material of lower potential serves as the negative electrode, and a material of higher potential serves as the positive electrode. When put in combination with the positive electrode layer described above, the electrode layer according to the embodiment becomes a negative electrode layer. The aforementioned Li composite oxides are conventionally used as a positive electrode active material. In other words, replacing a negative electrode with that of the embodiment can impart the performance as a power storage device.

The separator layer 13 serves to provide a certain interval between the negative electrode layer 12 and the positive electrode layer 14. Examples of the separator layer 13 include porous layers, such as a polyethylene porous layer and a polypropylene porous layer. An electrolytic solution containing Li ions is permeated into the separator layer 13. As the electrolytic solution, an organic solvent, an ionic liquid, or the like may be applied. Examples of the organic solvent include ethylene carbonate (EC), propylene carbonate (PC), butylene carbonate (BC), dimethyl carbonate (DMC), diethyl carbonate (DEC), ethyl methyl carbonate (EMC), gamma butyrolactone (γ-BL), valerolactone (VL), and a mixed solvent thereof. Examples of the electrolyte include $LiPF_6$, $LiBF_4$, $LiClO_4$, $LiCF_3SO_3$, and mixed electrolytes thereof.

Next, a method of producing the tungsten oxide powder according to the embodiment will be described. So long as the tungsten oxide powder according to the embodiment has the above-described configuration, the production method thereof is not limited, but the following production method is exemplified as one for attaining a high yield.

The method for producing the tungsten oxide powder is characterized with having, preparing an aqueous solution of tungstic acid containing 10 wt % to 90 wt % of tungstic acid, mixing an alkaline aqueous solution with the aqueous solution of tungstic acid to adjust a pH of an alkaline-mixed aqueous solution to 8 to 11, mixing an acidic aqueous solution with the alkaline-mixed aqueous solution to adjust a pH of an acid-mixed aqueous solution to 5.0 to 7.4, precipitating a crystal of tungstate in the acid-mixed aqueous solution, drying the crystal, and firing the dried crystal in an oxygen-containing atmosphere.

First, a process of preparing an aqueous solution of tungstic acid containing tungstic acid of 10 wt % to 90 wt % is performed. Tungstic acid is represented by $H_2WO_4$. Pure water is used as the water. The pure water is of A1 to A4 grade indicated by JIB-K-0557. 10 wt % to 90 wt % of tungstic acid and water are mixed to prepare an aqueous solution of tungstic acid. If the amount of tungstic acid is less than 10 wt %, the amount of tungsten oxide powder obtained at one time is little. If the tungstic acid exceeds 90 wt %, uniform dispersion of tungstic acid in the aqueous solution is difficult. If tungstic acid is not uniformly dispersed in the aqueous solution, the reaction in the subsequent process becomes non-uniform and the yield decreases. Therefore, the content of tungstic acid is preferably 10 wt % to 90 wt %, and more preferably 40 wt % to 80 wt %. The yield is improved by setting the content of tungstic acid to 40 wt % or more. This is because the reaction described later becomes active by increasing the proportion of tungstic acid.

Next, a process of mixing an alkaline aqueous solution with the aqueous solution of tungstic acid, thereby adjusting the pH of the alkaline-mixed aqueous solution to 8 to 11, is performed. The alkaline-mixed aqueous solution is a mixture of the above-mentioned aqueous solution of tungstic acid and an alkaline aqueous solution. By setting the pH in the range of 8 to 11, a reaction product of tungstic acid and an alkaline compound can be formed. The reaction product of tungstic acid and the alkaline compound is water-soluble. Therefore, the reaction product can be uniformly formed within an aqueous solution. When the pH is less than 8, the reaction product is inadequately formed. When the pH exceeds 11, the amount of the alkaline aqueous solution used increases. When the amount of alkaline aqueous solution increases, careful handling in terms of safety becomes necessary. Therefore, the pH of the alkaline-mixed aqueous solution is preferably 8 to 11, and more preferably 9.5 to 10.5.

The pH is examined by measurement using a pH meter. The alkaline aqueous solution is preferably mixed into the aqueous solution of tungstic acid while immersing the pH meter in the solution.

The alkaline aqueous solution is preferably one selected from an amine aqueous solution and a hydroxide aqueous solution.

Also, the amine is preferably one selected from ammonia, methylamine, dimethylamine, and trimethylamine. These can form amine tungstate.

Further, the hydroxide is preferably one selected from sodium hydroxide (NaOH), potassium hydroxide (KOH), and baking soda. These can form tungstic acid hydroxide. Ammonia can form ammonium tungstate as a reaction product with tungstic acid. Ammonia ($NH_3$) dissolves easily in water, and so, an ammonia-based aqueous solution is easy to make.

Among the amine aqueous solution and the hydroxide aqueous solution, the ammonia aqueous solution is preferable. Ammonia is the most soluble in water and is inexpensive.

In the above process, an alkaline-mixed aqueous solution is prepared by mixing an alkaline aqueous solution or a hydroxide aqueous solution with the aqueous solution of tungstic acid. In place of the process, amine tungstate or tungstic acid hydroxide may be used as raw material. In the case of using amine tungstate or tungstic acid hydroxide as raw material, as well, an alkaline-mixed aqueous solution having a pH of 8 to 11 is prepared.

Next, a process of mixing an acidic aqueous solution with the alkaline-mixed aqueous solution, thereby adjusting the pH of the acid-mixed aqueous solution to 5.0 to 7.4, is performed. The acid-mixed aqueous solution is a mixture of the alkaline-mixed aqueous solution and an acidic aqueous solution. By setting the pH in the range of 5.0 to 7.4, crystals of an alkali tungstate compound can be precipitated. Since crystals are precipitated in an aqueous solution, they can be obtained as primary particles.

When the pH is lower than 5.0, the particle size may become too small and it may be difficult to control the aspect ratio. When the pH is higher than 7.4, the formation of the alkali tungstate compound may be insufficient. Therefore, the pH of the acid-mixed aqueous solution is preferably 5.0 to 7.4, and more preferably 6.0 to 7.2.

The acidic aqueous solution is preferably mixed into the alkaline-mixed aqueous solution while immersing the pH meter in the solution.

Examples of the acidic aqueous solution include an aqueous solution containing one selected from hydrochloric acid (HCl), citric acid, sulfuric acid ($H_2SO_4$), and nitric acid ($HNO_3$). Since these acids are soluble in water, it is easy to prepare an acidic aqueous solution.

The acidic aqueous solution preferably has a concentration in the range of 5% to 45% by mass. When the concentration is less than 5% by mass, the amount of the acid component is small. Therefore, the amount of the acidic aqueous solution for adjusting the pH increases. When the concentration exceeds 45% by mass, the acidity becomes too strong and the handling in terms of safety becomes poor.

Adjusting the pH of the alkaline-mixed aqueous solution or the acid-mixed aqueous solution is performed adjusted while stirring. By stirring, the aqueous solutions can be uniformly mixed. By uniformly mixing, the particle size of the obtained crystals of the alkali tungstate compound can be made uniform. In addition, agglomeration of primary particles into secondary particles can be prevented. The stirring time is preferably 30 minutes or longer. The upper limit of the stirring time is not particularly limited, but is preferably 40 hours or shorter. If longer than 40 hours, no further effect may be obtained. Therefore, the stirring time is preferably 30 minutes to 40 hours, preferably 1 hour to 30 hours, and more preferably 10 hours to 30 hours.

The shorter the stirring time, the smaller the particle size. For example, if the stirring time is 5 hours or shorter, the average particle size of the major axis can be made 3 µm or less. If the stirring time is 6 hours or longer, the average particle size of the major axis can be made 3 µm or more.

The stirring time is determined according to the target particle size. For example, when used as a material for a photocatalyst or electrochromic, the particle size is preferably as small as 3 µm or less. When used as an electrode material for batteries, the particle size may be 3 µm or more. Generally, the shorter the stirring time, the lower the yield.

Further, the pH is measured with a pH meter. The acid-mixed aqueous solution is preferably mixed into the alkaline-mixed aqueous solution while immersing the pH meter in the solution.

Next, the process of drying the crystals is performed. As described above, precipitation of crystals is performed in an aqueous solution. A drying process is performed to evaporate the water content. For the drying process, heating in the range of 80° C. to 200° C. is preferable. Below 80° C., evaporation of the water content takes time. Above 200° C., grain growth may occur. Also, the crystals may react with the atmosphere. Therefore, the drying process is preferably performed at 80° C. to 250° C., more preferably 80° C. to 200° C., and further preferably 100° C. to 180° C. The drying process may be performed in the air, as long as the temperature is as described above.

The obtained crystals are preferably filtered out and washed with water before performing the drying process. Impurities can be removed by filtration. In addition, crystals having a particle size larger than the target size can be removed. A filter paper having an opening of 1 µm to 15 µm is preferably used, and more preferably a filter paper having an opening of 1 µm to 10 µm. The filtration may be performed a plurality of times. By performing filtration a plurality of times with varying opening size, just the crystals within the target size range can be taken out.

Impurities can also be removed by the washing with water. Components that had not precipitated as crystals can be removed. Since the process of precipitating crystals is performed with an aqueous solution, the water washing process is effective. The water washing process is preferably performed using pure water. Performing the water washing process a plurality of times is also effective. Performing both the filtration process and the water washing process is also effective. Alternately performing the filtration process and the water washing process is also effective. By performing the water washing process between the filtration processes, removal of impurities and control of the particle size can be performed efficiently.

Further, crystals of the alkali tungstate compound may be pulverized in order to adjust the particle size. When the upper and lower limits of the particle size are adjusted using filter papers having different openings, the pulverization process is unnecessary. In the case where the stirring treatment is performed in the adjustment process for the acid-mixed aqueous solution, the variation in particle size is reduced, and therefore, the pulverization process need not be performed.

When adjusting the upper limit of the particle size, preferably used is a filter paper having openings larger than the target particle size by about 3 μm to 5 μm. The filter paper has a structure in which warp threads and weft threads are woven. Therefore, the openings have a square shape. When elongated particles are passed through square holes, relatively large holes are preferable. If the sizes are close, clogging is likely to occur. The opening is also called a mesh.

Through production under the above conditions, alkali tungstate compound crystals having an average particle size along the major axis of 10 μm or less and an average aspect ratio of 10 or less can be obtained.

Next, a process of firing the dried crystals in an oxygen-containing atmosphere is performed. Examples of the oxygen-containing atmosphere include air. The atmosphere may be an inert atmosphere containing oxygen. Examples of the inert atmosphere include nitrogen and argon. The firing temperature is preferably 300° C. to 800° C., more preferably 300° C. to 450° C., and further preferably 300° C. to 430° C. The firing time is preferably 20 minutes to 2 hours.

If the firing temperature is higher than 500° C., hexagonal tunnels are difficult to form.

By performing the firing process, the crystals of the alkali tungstate compound can be made into tungsten oxide crystals. Since the crystals are made straightly into tungsten oxide crystals, the variation in particle size can be reduced. In addition, the occurrence of crystal defects can be suppressed. Crystal defects are formed in the case where the reaction is non-uniform when a crystal of an alkali tungstate compound is made into a tungsten oxide crystal. In addition, crystal defects may occur if grain growth occurs too much. Crystal defects are also formed by applying physical stress to the tungsten oxide crystal. For example, when elongated crystals are pulverized, crystal defects are likely to be formed on the pulverized surface.

As described above, the method for producing the tungsten oxide powder according to the embodiment is a synthetic method using an aqueous solution. The synthetic method reaction takes place in an aqueous solution is called a liquid phase synthesis method. Like that in Patent Literature 1, when using plasma flame, a tungsten oxide power is exposed to a high temperature, so that grain growth is apt to occur. When grain growth occurs, a tungsten oxide power having an aspect ratio of 10 or more is likely to be formed. In addition, plasma flame is different in temperature between an inner side and an outer side. From this reason as well, the variation in particle size has been large. In addition, powder having a large aspect ratio often fractured. Crystal defects has been formed on the sectional surface of fracture. The method for producing the tungsten oxide powder according to the embodiment can provide a tungsten oxide powder having an aspect ratio of 10 or less and further 5 or less. Therefore, a fractured cross-sectional surface hardly forms, because fracturing of the powder can be suppressed.

When providing oxygen deficiency, the tungsten oxide powder is preferably heat-treated in an inert atmosphere or a reducing atmosphere. Examples of the inert atmosphere include nitrogen gas and argon gas. Examples of the reducing atmosphere include a hydrogen-containing atmosphere.

The heat treatment temperature for providing oxygen deficiency is preferably 530° C. to 900° C. The heat treatment time is preferably 1 minute to 60 minutes. If the temperature is lower or the time is shorter, the amount of oxygen deficiency will be insufficient. If the temperature is higher or the time is longer, grain growth will occur. If grain growth occurs, the aspect ratio may increase. Therefore, the heat treatment for providing oxygen deficiency is preferably performed at a heat treatment temperature of 530° C. to 900° C., and more preferably 600° C. to 850° C. The heat treatment time is preferably 1 minute or longer. The upper limit of the heat treatment time is not particularly limited, but is preferably 240 minutes or shorter. If longer than 240 minutes, the amount of oxygen deficiency may become too great. Therefore, the heat treatment time is preferably 1 minute to 240 minutes, and more preferably 1 minute to 60 minutes.

In addition, the tungsten oxide powder may undergo grain growth when heat treatment is performed to provide oxygen deficiency. Therefore, when providing oxygen deficiency, attention is paid to the heat treatment conditions so as to satisfy the average particle size along the major axis of the tungsten oxide powder is 10 μm or less and the average aspect ratio is 10 or less even after the heat treatment.

EXAMPLES

Examples 1 to 12 and Comparative Examples 1 to 3

Aqueous solutions of tungstic acid, alkaline aqueous solutions, and acidic aqueous solutions as shown in Table 1 were prepared.

In Examples 1 to 6, Examples 9 to 12, and Comparative Examples 1 and 2, the alkaline aqueous solution was ammonia water (ammonia content 28 wt %). In Examples 1 to 6, Examples 9 to 12 and Comparative Examples 1 and 2, the acidic aqueous solution contained 35 wt % of hydrochloric acid (HCl). In Example 7, a methylamine aqueous solution (methylamine content 40 wt %) was used as the alkaline aqueous solution, and the acidic aqueous solution contained 35 wt % of hydrochloric acid. In Example 8, ammonia water (ammonia content 28 wt %) was used as the alkaline aqueous solution, and the acidic aqueous solution was a citric acid aqueous solution (citric acid content 30 wt %). For each, pure water was used as the water.

An aqueous solution of tungstic acid and an alkaline aqueous solution were mixed to prepare an alkaline-mixed aqueous solution. Further, the alkaline-mixed aqueous solution and an acidic aqueous solution were mixed to prepare an acid-mixed aqueous solution. Each condition is as shown in Table 1. The pH was measured with a pH meter.

The pH was adjusted by changing the amount of the alkaline aqueous solution added or the acidic aqueous solution added.

TABLE 1

| | Aqueous solution of tungstic acid | | Alkaline-mixed aqueous solution | Acid-mixed aqueous solution | |
|---|---|---|---|---|---|
| | $H_2WO_4$ concentration (wt %) | pH | Stirring time (H) | pH | Stirring time (H) |
| Example 1 | 10 | 8.2 | 1 | 6.0 | None |
| Example 2 | 30 | 9.5 | 5 | 6.5 | 15 |
| Example 3 | 40 | 9.8 | 24 | 6.8 | 20 |
| Example 4 | 50 | 10.1 | 3 | 7.0 | 24 |
| Example 5 | 70 | 10.8 | 8 | 7.2 | 24 |
| Example 6 | 90 | 10.5 | 1 | 7.1 | 24 |
| Example 7 | 40 | 10.2 | 12 | 6.9 | 20 |
| Example 8 | 40 | 10.3 | 15 | 6.7 | 20 |
| Example 9 | 45 | 9.6 | 1 | 7.1 | 1 |
| Example 10 | 50 | 10.2 | 1 | 6.7 | 2 |
| Example 11 | 10 | 10.1 | 18 | 7.0 | 6 |

TABLE 1-continued

|  | Aqueous solution of tungstic acid | Alkaline-mixed aqueous solution | | Acid-mixed aqueous solution | |
|---|---|---|---|---|---|
|  | $H_2WO_4$ concentration (wt %) | pH | Stirring time (H) | pH | Stirring time (H) |
| Example 12 | 40 | 10.0 | 4 | 6.9 | 20 |
| Comparative Example 1 | 5 | 8.2 | 1 | 6.5 | None |
| Comparative Example 2 | 10 | 9.2 | 1.5 | 3.5 | 15 |

In the process of adjusting the acid-mixed aqueous solution of Example 1 and Comparative Example 1, the mixture was left for 15 hours without stirring. In Comparative Example 1, the amount of tungstic acid in the aqueous solution of tungstic acid was little. In Comparative Example 2, the pH of the acid-mixed aqueous solution was low.

Precipitation of crystals of ammonium tungstate were confirmed in each of the acid-mixed aqueous solutions of the examples and the comparative examples.

Next, each acid-mixed aqueous solution was used to perform a filtration process and a water washing process. Pure water was used in the water washing process. The conditions are as those shown in Table 2. In Example 1 and Comparative Example 1 in which the filtration process was not performed, the pulverization process was performed.

TABLE 2

|  | Filtration process, water washing process | Pulverization process |
|---|---|---|
| Example 1 | Washing with water | Performed |
| Example 2 | Filter paper with opening of 10 μm → washing with water | Not Performed |
| Example 3 | Filter paper with opening of 10 μm → washing with water → filter paper with opening of 1 μm → washing | Not Performed |
| Example 4 | Washing with water → filter paper with opening of 10 μm → washing with water | Not Performed |
| Example 5 | Washing with water → filter paper with opening of 10 μm → washing with water → filter paper with opening of 1 μm → washing with water | Not Performed |
| Example 6 | Washing with water → filter paper with opening of 10 μm → washing with water → filter paper with opening of 1 μm → washing with water | Not Performed |
| Example 7 | Filter paper with opening of 10 μm → washing with water | Not Performed |
| Example 8 | Filter paper with opening of 10 μm → washing with water | Not Performed |
| Example 9 | Washing with water → filter paper with opening of 5 μm → washing with water → filter paper with opening of 1 μm → washing with water | Not Performed |
| Example 10 | Washing with water → filter paper with opening of 4 μm → washing with water → filter paper with opening of 1 μm → washing with water | Not Performed |
| Example 11 | Washing with water → filter paper with opening of 10 μm → washing with water | Not Performed |
| Example 12 | Filter paper with opening of 10 μm → washing with water | Not Performed |
| Comparative Example 1 | Washing with water | Performed |
| Comparative Example 2 | Filter paper with opening of 10 μm → washing with water | Not Performed |

Next, a drying process and a firing process were performed. Both the drying process and the firing process were performed in the air. The conditions are as those shown in Table 3.

In Example 12, the drying process was not performed and the temperature of the firing process was made high.

TABLE 3

|  | Drying process | Firing process |
|---|---|---|
| Example 1 | 100° C. | 350° C. × 1 hour |
| Example 2 | 160° C. | 330° C. × 2 hours |
| Example 3 | 180° C. | 400° C. × 30 minutes |
| Example 4 | 120° C. | 370° C. × 1 hour |
| Example 5 | 130° C. | 350° C. × 2 hours |
| Example 6 | 130° C. | 380° C. × 1 hour 30 minutes |
| Example 7 | 120° C. | 370° C. × 50 minutes |
| Example 8 | 130° C. | 360° C. × 50 minutes |
| Example 9 | 120° C. | 350° C. × 1 hour |
| Example 10 | 130° C. | 360° C. × 50 minutes |
| Example 11 | 130° C. | 330° C. × 30 minutes |
| Example 12 | — | 750° C. × 1 hour |
| Comparative Example 1 | 130° C. | 350° C. × 1 hour |
| Comparative Example 2 | 130° C. | 350° C. × 1 hour |

A tungsten oxide powder was obtained through the above processes. Next, the average particle size along the major axis and the aspect ratio of the tungsten oxide powder according to each example and each comparative example were measured. For the measurement of major axis and aspect ratio, each tungsten oxide powder was observed by SEM. A SEM photograph magnified 3000 times was used. The major axis and the minor axis of the tungsten oxide powder shown in the SEM photograph were measured. The longest diagonal was defined as the major axis. The length extending perpendicularly from the midpoint of the major axis was defined as the minor axis. The aspect ratio was calculated by "major axis/minor axis". This procedure was performed on 100 particles. The average values thereof were determined to be the average particle size along the major axis and the average aspect ratio. The minimum value is the smallest value among the 100 particles. The maximum value is the largest value of among 100 particles.

The yield of each production method was also obtained. With regard to the yield, conversion of all the used tungstic acid into tungsten oxide powder was defined as 100%. The mass of the obtained tungsten oxide powder was measured, and the yield was obtained by the ratio.

The results are shown in Table 4.

TABLE 4

| | Major axis | | | Aspect ratio | | | |
|---|---|---|---|---|---|---|---|
| | Average particle size (μm) | Minimum value (μm) | Maximum value (μm) | Average value | Minimum value | Maximum value | Yield (%) |
| Example 1 | 3 | 0.05 | 6 | 9 | 5 | 30 | 10 |
| Example 2 | 4 | 0.1 | 7 | 8 | 4 | 25 | 30 |
| Example 3 | 5 | 0.2 | 8 | 8 | 4 | 25 | 40 |
| Example 4 | 5 | 0.5 | 10 | 7 | 2 | 22 | 60 |
| Example 5 | 6 | 0.5 | 10 | 6 | 3 | 22 | 90 |
| Example 6 | 6 | 0.5 | 10 | 6 | 2 | 20 | 90 |
| Example 7 | 5 | 0.03 | 12 | 8 | 3 | 27 | 40 |
| Example 8 | 4 | 0.02 | 13 | 9 | 3 | 26 | 40 |
| Example 9 | 1 | 0.01 | 6 | 5 | 1.3 | 18 | 30 |
| Example 10 | 2 | 0.02 | 9 | 7 | 1.8 | 21 | 35 |
| Example 11 | 3 | 0.4 | 9 | 6 | 2 | 20 | 45 |
| Example 12 | 5 | 0.5 | 10 | 7 | 2 | 25 | 50 |
| Comparative Example 1 | 1 | 0.1 | 1 | 10 | 6 | 25 | 10 |
| Comparative Example 2 | 0.5 | 0.1 | 1 | 9 | 5 | 24 | 3 |
| Comparative Example 3 | 0.0371 | 0.002 | 0.15 | 15 | 1.1 | 50 | — |

Next, the presence or absence of crystal defects on the surface of each tungsten oxide powder in the minor axis direction and the presence or absence of the hexagonal tunnel structure along the major axis were measured.

For measurement of the crystal defect and the hexagonal tunnel structure, a sample obtained by forming a thin film of the powder by a dispersion method was observed with a scanning transmission electron microscope having an aberration correction function (Cs-corrected STEM) at an acceleration voltage of 200 V.

The number of crystal defects per unit area of 3 nm×3 nm was counted to determine the presence or absence of crystal defects on the surface or cross section of the primary particles in the minor axis direction. Arbitrary unit areas of 3 nm×3 nm on the surface in the minor axis direction were measured at three locations, and the largest value was indicated.

Regarding the hexagonal tunnel structure, powder in which hexagonal tunnels were observed at both ends of the major axis and at the center thereof were determined to have a hexagonal tunnel structure along the major axis. The results are shown in Table 5.

The presence or absence of crystal defects on the surface on the major axis side was determined by STEM observation of an arbitrary unit area of 3 nm×3 nm on the lateral surface on the major axis side.

Further, as Comparative Example 3, tungsten oxide powder manufactured using plasma flame was prepared. Tungsten oxide powder was prepared as raw material powder. The raw material powder was put into the plasma flame, and through a sublimation process, a tungsten oxide powder having a major axis with an average particle size of 18.2 nm was obtained. Thereafter, a heat treatment was performed at 450° C. in the air for 5 hours, and tungsten oxide powder having an average particle size of 37.1 nm along the major axis was obtained. In Comparative Example 3, the average aspect ratio was 15. Similar measurements were made also for Comparative Example 3.

TABLE 5

| | Crystal defects on surface in minor axis direction: Number of crystal defects per unit area of 9 nm². | Presence or absence of crystal defect on major axis lateral surface | Presence or absence of hexagonal tunnel structure along major axis |
|---|---|---|---|
| Example 1 | 4 | Absent | Present |
| Example 2 | 2 | Absent | Present |
| Example 3 | 1 | Absent | Present |
| Example 4 | 0 | Absent | Present |
| Example 5 | 0 | Absent | Present |
| Example 6 | 0 | Absent | Present |
| Example 7 | 0 | Absent | Present |
| Example 8 | 0 | Absent | Present |
| Example 9 | 0 | Absent | Present |
| Example 10 | 0 | Absent | Present |
| Example 11 | 1 | 1 present | Present |
| Example 12 | 0 | Absent | Absent |
| Comparative Example 1 | 7 | Absent | Present |
| Comparative Example 2 | 5 | Absent | Absent |
| Comparative Example 3 | 12 | Absent | Absent |

The tungsten oxide powders of Examples 1 to 12 were observed as having few crystal defects. Further, when the heat treatment temperature in the firing process was high as in Example 12, the hexagonal tunnel was not formed. In Comparative Examples 1 to 3, many crystal defects in the minor axis direction were observed.

Examples 1B to 12B and Comparative Examples 1B to 3B

A heat treatment was performed on the tungsten oxide powders of Examples 1 to 12 and Comparative Examples 1 to 3 to provide oxygen deficiency. The heat treatment was performed at 600° C. to 850° C. for 30 minutes to 1 hour in a nitrogen atmosphere. The amount of oxygen deficiency in tungsten oxide powder according to the examples and comparative examples matched $WO_{3-x}$, within the range of $0.1 \leq x \leq 0.3$.

Even after the heat treatment for providing oxygen deficiency, the tungsten oxide powder according to the examples had an average particle size along the major axis of 10 μm or less and an average aspect ratio of 10 or less.

Measurement of the amount of oxygen deficiency was performed by quantifying the amount of $KMnO_4$ required to oxidize all W ions having a low charge ($W^{4+}$, $W^{5+}$) into $W^{6+}$ using a $KMnO_4$ solution, via chemical analysis. By this analysis, the tungsten oxide was replaced into $WO_{3-x}$, and the x value was obtained.

Next, a power storage device was manufactured. A power storage device having the cell structure shown in FIG. 3 was manufactured.

First, an electrode layer was formed by manufacturing a paste in which acetylene black was mixed with tungsten oxide powder according to the examples and the comparative examples, and applying, drying, and pressing the paste. In each of the examples and the comparative examples, the tungsten oxide powder was mixed in an amount of 90 parts by mass and the acetylene black was mixed in an amount of 10 parts by mass. The electrode layer had an amount per area of 3.3 mg/cm², a film thickness of 20 µm, and a void fraction of 20%.

The negative-electrode-side electrode layer 11 and the positive-electrode-side electrode layer 15 were an electroconductive coated aluminum foil having a thickness of 15 µm. The electrode layers according to the examples and the comparative examples were used as the negative electrode layer 12. LiCoO₂ powder was used for the positive electrode layer 14. The amount per area of the positive electrode layer was set to have a sufficient margin with respect to the electric capacity of the negative electrode layer. The electrode area was set to a diameter of 16 mm (about 2 cm²) for both the negative electrode and the positive electrode.

As the separator layer 13, a polyethylene porous layer (20 µm thickness) was used. A stack configured of the negative-electrode-side electrode layer 11, the negative electrode layer 12, the separator layer 13, the positive electrode layer 14, and the positive-electrode-side electrode layer 15 was incorporated into a cell container made of aluminum. Subsequently, the stack was impregnated with an electrolytic solution and then, a degassing treatment was performed, and sealing was provided. The electrolyte solution was a mixture of propylene carbonate (PC) and ethyl methyl carbonate (EMC). As the electrolyte, a mixture of LiPF₆ and LiSF₄ was used.

In this manner, the power storage device was manufactured. Next, the power density, energy density, and capacity retention ratio of the power storage device were obtained.

Power density of a single cell of the power storage device expressed in terms of weight, namely, the weight power density P (W/kg) was obtained by $P(W/kg) = (V_1^2 - V_2^2)/4RM$. Here, $V_1$ is a discharge initial voltage (V), $V_2$ is a discharge termination voltage (V), R is an internal resistance (Ω), and M is a cell weight (kg).

Energy density E (Wh/kg) was obtained by $E(Wh/kg) = (Ah \times V_{ave})/M$. Here, Ah is a discharge capacity (Ah) at 0.2C rate, $V_{ave}$ is an average discharge voltage, and M is a cell weight (kg).

For the cycle retention ratio, an atmospheric temperature was set to 45 s° C., and a capacity retention ratio after 5000 cycles was measured, taking the initial discharge capacity at 5 C rate as 100%.

The results are shown in Table 6.

TABLE 6

| | Tungsten oxide powder before providing oxygen deficiency | Power density (Wh/kg) | Energy density (Wh/kg) | Capacity retention ratio (%) |
|---|---|---|---|---|
| Example 1B | Example 1 | 7200 | 20 | 73 |
| Example 2B | Example 2 | 7500 | 22 | 75 |
| Example 3B | Example 3 | 7600 | 22 | 76 |
| Example 4B | Example 4 | 8000 | 25 | 79 |
| Example 5B | Example 5 | 8200 | 27 | 80 |
| Example 6B | Example 6 | 8100 | 28 | 80 |

TABLE 6-continued

| | Tungsten oxide powder before providing oxygen deficiency | Power density (Wh/kg) | Energy density (Wh/kg) | Capacity retention ratio (%) |
|---|---|---|---|---|
| Example 7B | Example 7 | 7900 | 27 | 78 |
| Example 8B | Example 8 | 7900 | 28 | 78 |
| Example 9B | Example 9 | 8100 | 26 | 77 |
| Example 10B | Example 10 | 8000 | 27 | 78 |
| Example 11B | Example 11 | 7900 | 24 | 76 |
| Example 12B | Example 12 | 6000 | 19 | 82 |
| Comparative Example 1B | Comparative Example 1 | 7100 | 18 | 71 |
| Comparative Example 2B | Comparative Example 2 | 7100 | 19 | 72 |
| Comparative Example 3B | Comparative Example 3 | 7000 | 18 | 70 |

As is recognized from the table, the power density, the energy density, and the capacity retention ratio have improved. This is because the intercalation property of the ions has improved since the occurrence of crystal defects is suppressed.

In addition, the performance of Examples 4 to 8 without crystal defects was better.

According to one or more embodiment and example described above, a tungsten oxide powder is provided. The average particle size along a major axis of the tungsten oxide powder is 10 µm or less, and the average aspect ratio thereof is 10 or less. 0 to 4 crystal defects per unit area of 9 nm² are present on a surface or sectional surface in a direction of a minor axis of a primary particle of the tungsten oxide powder. The tungsten oxide powder has few crystal defects, and therefore is excellent in intercalation property.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A tungsten oxide powder, having an average particle size along a major axis of 10 µm or less, an average aspect ratio of 10 or less, and 0 to 2 crystal defects per unit area of 9 nm² on a surface or sectional surface in a direction of a minor axis of a primary particle,
    wherein 50% by mass or more of a crystal structure belongs to a monoclinic crystal, and
    the tungsten oxide powder comprises a hexagonal tunnel structure along the major axis.

2. The tungsten oxide powder according to claim 1, comprising oxygen deficiency.

3. The tungsten oxide powder according to claim 1, for use in one selected from the group consisting of photocatalytic material, electrochromic material, and electrode material for batteries.

* * * * *